March 5, 1968  J. GALLETTA  3,371,587
CAMERA POSE COUNTER

Filed Aug. 27, 1965  3 Sheets-Sheet 1

INVENTOR.
JOSEF GALLETTA
BY Amster & Rothstein
ATTORNEYS

March 5, 1968
J. GALLETTA
3,371,587
CAMERA POSE COUNTER
Filed Aug. 27, 1965
3 Sheets-Sheet 2
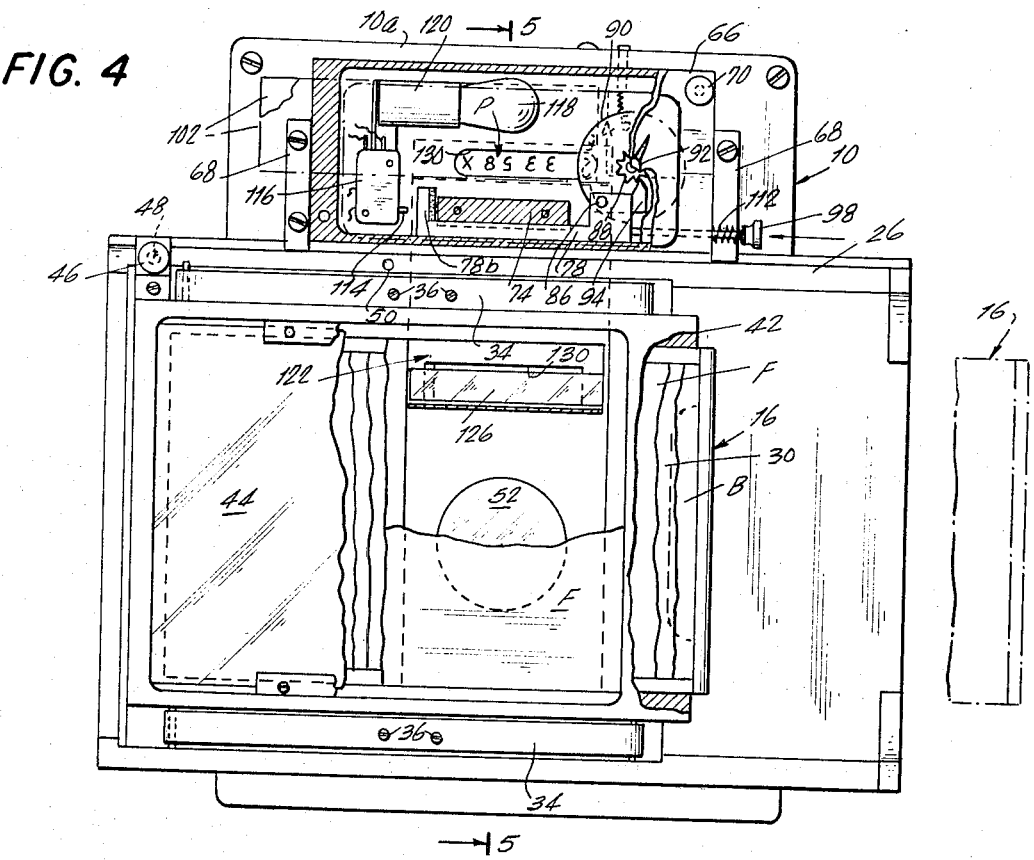
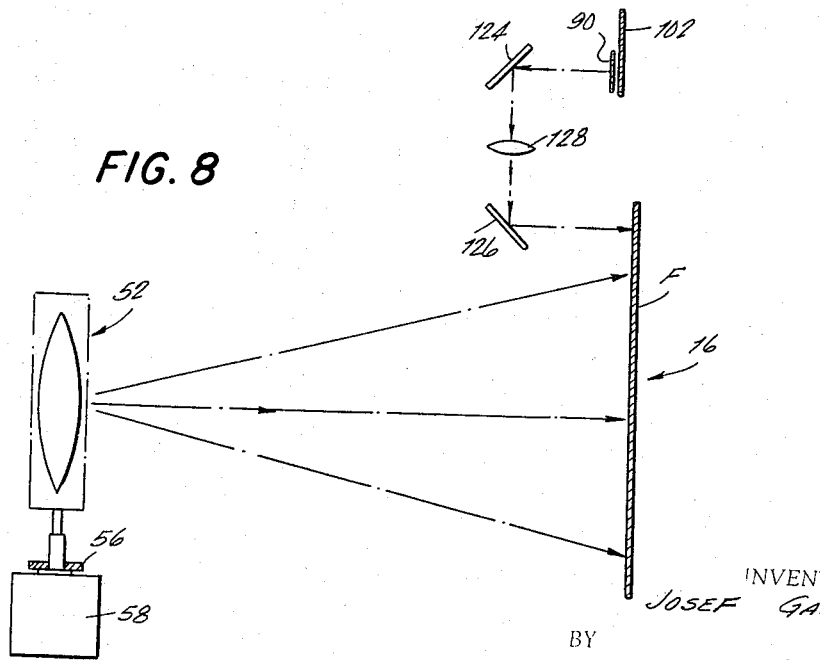
INVENTOR.
JOSEF GALLETA
BY
Amster & Rothstein
ATTORNEYS

United States Patent Office 3,371,587
Patented Mar. 5, 1968

3,371,587
CAMERA POSE COUNTER
Josef Galletta, Brooklyn, N.Y., assignor to Kemex Manufacturing Corporation, Brooklyn, N.Y., a corporation of New York
Filed Aug. 27, 1965, Ser. No. 483,188
2 Claims. (Cl. 95—1.1)

The present invention relates to means for applying an identifying number to film, and more particularly to an improved pose counter operatively combined with a camera to apply an identifying number to the film exposed during the use of said camera.

It is customary during the taking of portrait photographs for the photographer to take many shots of the subject in numerous poses, the best of which are later selected by the subject. When considering these numerous photographs, it is an obvious advantage to have a number permanently associated with each pose for positive identification of the photograph. While there are pose counter devices available to combine with cameras to provide an identifying number on the camera film, the make-up and operation of such devices are not entirely satisfactory. Such prior art devices are generally unduly complicated in construction and operation and are subject to frequent malfunction, and moreover most of these devices require operation independently of the camera with the result that the photographer often forgets to change the identifying number between poses.

Broadly, it is an object of the present invention to overcome the foregoing and other shortcomings of the prior art. Specifically, it is an object to provide a pose counter which is of simplified construction and mode of operation, and which further is so combined with the camera that it must be operated before the camera can be operated, thereby providing a positive reminder for the photographer to apply a different identifying number to each pose of the subject.

A pose counter demonstrating features of the present invention includes a number-displaying device presenting a changeable identification number. The number-displaying device is mounted externally of the camera and as such is readily accessible to be actuated so that a different identifying number is employed for identifying the different poses of the subject being photographed. This external position of the number-displaying device is located near the internally mounted film of the camera, and an essential feature of said pose counter is a periscope which is effective to transmit light from the externally mounted number-displaying device to an area of the internally mounted film. More particularly, this light is reflected from the number displayed by said number-displaying device and is effective when transmitted to the film to cause the reproduction of the number on the film. This is achieved without interfering with the condition of the film to effectively reproduce the photograph of the subject in a film area adjacent to the number. Another essential feature of the present pose counter is the requirement that said counter be operated to present a different identifying number for each pose before the camera shutter mechanism can be cocked, and thus there is provided positive assurance that the photographer will not forget to use the pose counter for the purpose intended.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 4 is a front elevational view of said pose counter in its mounted position upon the camera rear wall, in which portions of the structure are broken away to expose internal features of construction;

FIG. 8 is a diagrammatic view illustrating the manner in which the photograph of FIG. 7 is produced with an exposed exemplary portrait image thereon and with an exposed pose-identifying number.

Figure 1:
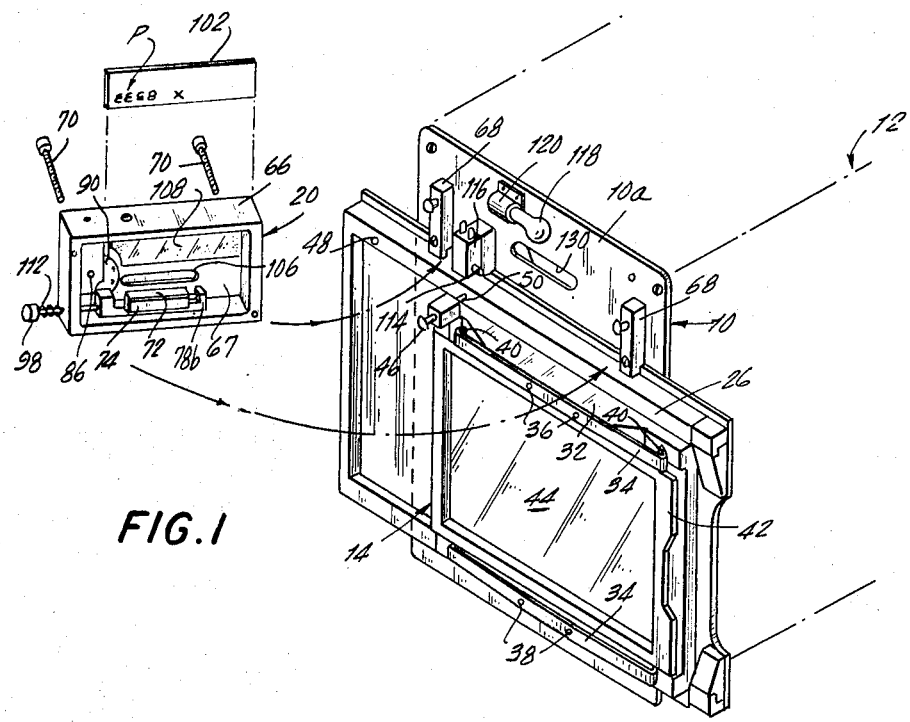
FIG. 1 is an exploded perspective view of a rear wall of a camera and of a pose counter for said camera demonstrating features of the present invention.
Figure 2:
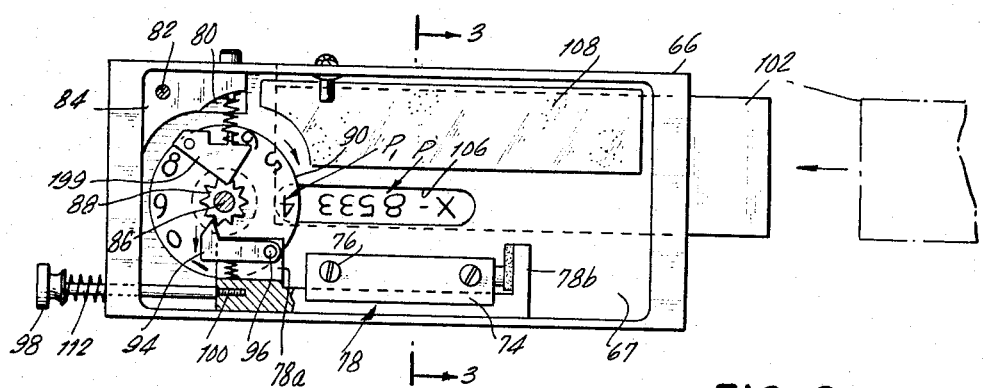
FIG. 2 is a rear elevational view of said pose counter with the camera wall mounting said counter partially broken away to expose internal features of construction thereof.
Figure 3:
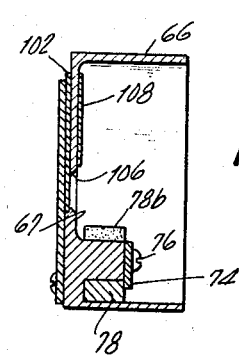
FIG. 3 is a side elevational view of said pose counter, in section, taken on line 3—3 of FIG. 2 illustrating further details of the construction thereof.
Figure 7:
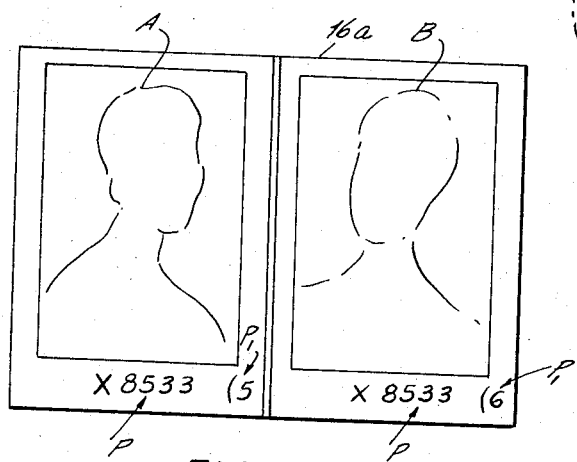
FIG. 7 is a perspective view of an exemplary photograph produced by the camera hereof having number-identified poses provided by the pose counter hereof.

Reference is now made to the drawings, and in particular to FIG. 1 in which there is shown a rear wall 10 of what will be understood to be a conventional camera 12 of the type usually used to take portrait pictures by professional photographers. Appropriately mounted transversely of the rear wall 10 is a film holding assembly, generally designated 14, including frame members, etc. for holding a commercial film pack 16 (see FIG. 5) adjacent an opening 18 in the camera rear wall 10. In its mounted position adjacent the rear wall opening 18, a film surface of the pack 16 is exposed during the use of the camera 12 in a manner which is well understood. Mounted externally along an upper end of the camera rear wall 10 is a pose counter, generally designated 20, which demonstrates features of the present invention. As will be explained in greater detail subsequently, the pose counter 20 includes means for displaying a pose-identifying number, herein designated P (see FIG. 2), which is effectively also exposed on the film surface to thereby serve as an identification number for the different poses of the subject being photographed by the photographer. This is best illustrated in FIG. 7 wherein there is shown a typical sheet of film 16a upon which, consistent with usual practice, there are two photographs of the subject in different poses A and B. Beneath each photograph A, B there is a pose-identifying number P provided in accordance with the present invention and serving in an obvious manner to identify both the subject photographed and the particular pose of the subject. In this connection, it will be noted that the last digit P1 of the identifying number P is different in each photograph A, B to distinguish between poses. Thus, and as will be subsequently explained in detail, an important functioning of the pose counter 20 hereof is the ability to successively number the photographs for purposes of positively identifying the different poses of the same subject.

Figure 5:
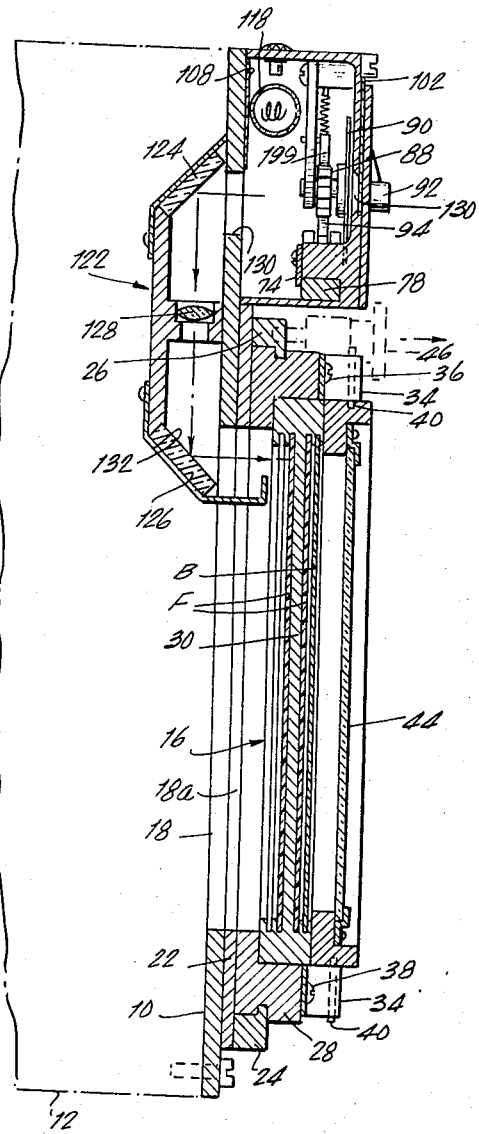
FIG. 5 is a side elevational view, on an enlarged scale, in section taken on line 5—5 of FIG. 4, best illustrating a light transmitting periscope of said pose counter.

Referring now to FIG. 5 in conjunction with FIG. 1, it will be seen that the film pack holding assembly 14 includes a plate 22 appropriately mounted to the rear wall 10 and having a medial opening 18a therein which is coextensive with the rear wall opening 18. Appropriately mounted along the upper and lower edges of the plate 22 are stationary guide frames 24, 26 which slidably mount a base frame 28. The film pack 16, consistent with general practice, includes a holding member 30 having sheets of film F and opaque paper B appropriately arranged on opposite sides of a medial wall of the holding member and slidable in peripheral grooves of this member. As best seen in FIG. 1, spring members 32, 34 are respectively connected at their medial portions, as at 36, 38 to the horizontally oriented sides of the rectangular base frame 26, and at their free ends engage pins, herein collectively designated 40, which extend from four corners of a cover frame 42. Appropriately mounted medially of the cover frame 42 is a frosted glass plate 44 which is firmly biased against the film pack 16 under the urgency of the springs 32, 34.

In practice, and as best illustrated in FIG. 5, a sheet of film F is appropriately arranged so that one-half of its surface area is adjacent the rear wall opening 18 and in this advantageous position can be exposed in the production of a photograph such as is exemplified by photograph A of FIG. 7. Following this, holding assembly 14 is appropriately moved in position along the stationary guide frames 24, 26 to place the other half of the film sheet adjacent the opening 18 preparatory to exposing this half of the film. The positions of the two sheets of film F of the film pack 16 are then interchanged in a manner which is well understood, and said second sheet of film is then processed in a similar manner so as to have two poses of the subject produced thereon in the manner illustrated in FIG. 7. The two sliding positions of the holding assembly 14 are established by the alignment of a spring-biased pin 46 appropriately mounted on the assembly 14 with openings 48, 50 provided in the upper horizontal side of stationary guide frame 26.

Figure 6:
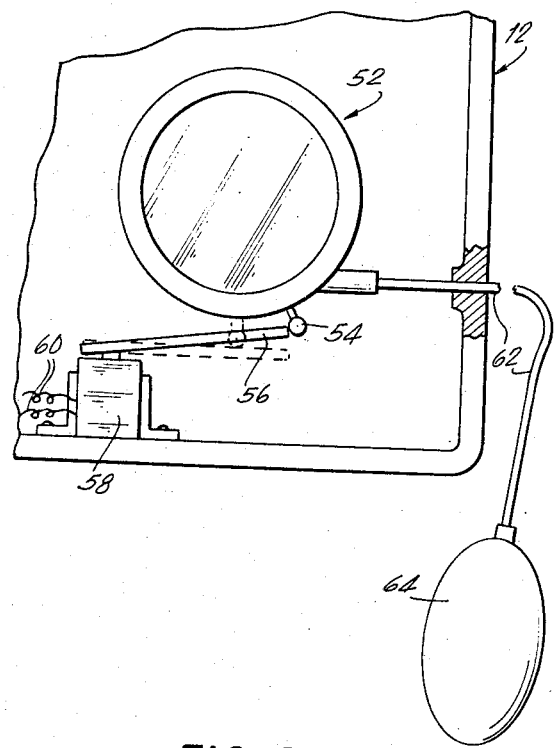
FIG. 6 is a partial front elevational view of the camera best illustrating the shutter mechanism thereof.

Attention is now directed to FIG. 6 in which there is shown a conventional electrically-operated shutter mechanism 52 of the camera 12. For present purposes, it suffices to note that the shutter mechanism 52 includes a shutter cock 54, the released position of which is shown in full line in FIG. 6 and the cocked position of which is shown in phantom perspective. Cooperating with the shutter cock 54 is a stop bar 56 having a normal position (shown in full line in FIG. 6) preventing the cocking of the shutter cock 54 unless actuated out of its blocking position by a solenoid 58 electrically pulsed through the conductors 60. It is contemplated that simultaneously with the pulsing of the solenoid 58 that the shutter mechanism 52 will also be electrically pulsed to move the shutter cock 54 into its cocked position. Tripping of the shutter mechanism 52 is achieved in a well known manner by a pulse of pressure air transmitted into the mechanism 52 through a tube 62 connected thereto and its other end to an elastomeric bulb 64.

Directing attention now more specifically to the construction of the pose counter 20, as best shown in FIG. 1, this member includes a hollow, rectangular box-like housing 66 which is mounted externally of the upper end 10a of the camera rear wall 10 between positioning blocks 68 in any appropriate manner, as by the screws 70. Molded integrally on the inner surface of the front wall 67 of the housing 66 is a mounting block 72 which together with a plate 74 secured thereto, as at 76, defines a track for a sliding block 78 of a wheel-advancing mechanism contained within the housing 66. A second mounting block 80 is integrally molded internally of the housing wall 67 in the upper left hand corner thereof (as viewed in FIG. 2) to which there is secured, as at 82, a support plate 84. Journalled for rotation between the support plate 84 and the housing front wall 67 is a shaft 86 upon which there is fixedly mounted a ratchet 88, a number-displaying wheel 90 having circumferentially spaced numbers thereon, and externally of the housing 66 a turning knob 92 (see FIG. 5). A spring-biased pawl 94 is pivotally mounted at 96 to a vertical leg of the slide block 78 and at its other end engages with the ratchet 88. A spring-biased plunger 98 having one end accessible to the exterior of the housing 66 has its other end threadably connected, as at 100, to the front vertical leg 78a of the slide block 78. Thus, in an obvious manner, by depressing the plunger 98 the slide block 78 is actuated into sliding movement past the ratchet 88, and during return movement said pawl 94 is effective to power the ratchet 88 and thus the shaft 86 in rotation. This in turn changes the position of rotation of the wheel 90, and assuming clockwise rotation thereof results in advancing a successively higher number P1 into proper position for display as part of the pose-identifying number P. A spring-loaded member 99 seats in the spacing of the teeth of ratchet 88 to positively establish each position of rotation of the ratchet.

The unchanging numbers or other indicia forming the remaining part of the pose-identifying number P is advantageously set forth on a card 102 slidably inserted in a slot formed between a plate 104 and the housing front wall 67 to which said plate 104 is appropriately connected. The housing front wall 67 has a window opening 106 for exposing the number P to view. Appropriately secured to the interior surface of the front wall 67, as by an adhesive or the like, is a light reflector 108. Slide block 78 terminates in a second vertical leg 78b. An elastomeric pad 110 is adhered along one side of the leg 78b to cushion the impact of this leg against the block 72 during the return stroke of the plunger 98 under the urgency of the return spring 112. The other surface of the leg 78b during the initial sliding stroke of the slide block 78 is adapted to actuate a switch 114 of a switching mechanism 116 mounted on the upper section 10a of the rear wall 10 in the path of movement of the slide block 78. Although not shown, it will be understood that the switching mechanism 116 is appropriately electrically wired and functions so that when the switch 114 thereof is depressed by the vertical leg 78b that this completes an electrical circuit for a light bulb 118 also appropriately mounted, as at 120, to the upper camera rear wall section 10a. Simultaneously with the energizing of the light 118, it will be further understood that the switching mechanism 116 is also effective to permit energizing of the electrically-operated shutter mechanism 52 and solenoid 58 such that the shutter cock 54 of said mechanism is actuated into its operative cocked position. Stated another way, the shutter mechanism 52 cannot be cocked until the plunger 98 of the pose counter 20 is actuated since cocking of said mechanism requires the energizing of the solenoid 58 in order to remove the blocking stop bar 56.

From the foregoing, it should therefore be appreciated that energizing of the light 118 by an appropriate electrical source occurs upon actuation of the plunger 98. In much the same way that reflected light from the subject is effective to produce a photograph, the light of the bulb 118 reflected from the numbers in display forming the pose-identifying number P within the pose counter 20 is likewise transmitted to an area on the sheet of film in position for exposure adjacent the camera rear wall 10 and is effective in causing the reproduction of said number P on said film sheet. To this end, the pose counter 20 includes a periscope 122 mounted internally of the camera 12. As is generally understood, the periscope 122 includes a set of inclined mirrors 124, 126 and an appropriate light transmitting lens 128. As clearly shown in FIG. 5, the upper end of the periscope in which the mirror 124 is confined is aligned with an opening 130 in the wall section 10a to the pose-identifying number P being displayed internally of the pose counter 20. The opposite lower end of the periscope 22 which houses the other mirror 126 extends down below the upper edge of the rear wall opening 18 for transmission of the reflected image to the surface area along the edge of the sheet of film being exposed. An appropriately configured bracket 132 attached, as at 134, to the body of the periscope 122 has a turned-up free end for confining the light reflected by the periscope 122 to a limited area on the film sheet F.

Thus the pose counter 20 having an externally accessible plunger 98 is effective in its operation to cause the production of a pose-identifying number P on each film sheet during use of the camera 12. Further, not only does the number P include indicia for identifying the photographs of different subjects, but the ability to change an end digit P1 of the number P permits ready identification of the various poses of a single subject. Thus, the pose counter 20 in combination with the camera 12 and interrelated in operation in the manner described herein is of considerable value to commercial photographers.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. The combination with a camera including plural walls and having means mounting film within said camera adjacent the rear wall thereof of a pose counter comprising a number-displaying device presenting numbers in display and including means mounting said device externally on said camera rear wall, a periscope supported on said camera in position for transmitting reflected light from said externally mounted number-displaying device to said internally mounted film, said periscope having one end in alignment with said numbers in display and its opposite end in alignment with an opening to said film in said camera rear wall, wherein reflected light transmitted through said periscope is effective to expose an area on said film with said numbers in display on said number-displaying device including a rotatable wheel displaying circumferentially spaced numbers and means mounting said wheel such that a number thereon forms one of said numbers in display, and means to advance said wheel in rotation for the successive numbering of film for identification purposes, and a shutter mechanism and stop means movable between a clearance position relative to said shutter mechanism and an operative position preventing the operation of said shutter mechanism, said stop means being normally in said operative position and operatively connected to said wheel advancing means of said number-displaying device wherein actuation of said wheel advancing means is effective to actuate said stop means into said clearance position permitting the operation of said shutter mechanism.

2. In combination, a camera having a shutter mechanism and plural walls forming a film-exposure enclosure, means on said camera for mounting film adjacent the rear wall thereof, and a pose counter for said camera comprising a number-displaying device presenting numbers in display, a housing enclosing said number-displaying device, a light source disposed within said housing and having an operative connection to said camera shutter mechanism for being energized upon the operation of said camera shutter mechanism, a periscope supported on said camera in position for transmitting the reflected light of said light source from said externally mounted number-displaying device to said internally mounted film, said periscope having one end in alignment with an opening to said numbers in display in said number-displaying device housing and its opposite end in alignment with an opening to said film in said camera rear wall, wherein said transmitted reflected light is effective to expose an area on said film with said numbers in display, said number-displaying device including a rotatably mounted wheel displaying circumferentially spaced numbers and means mounting said wheel such that in each position of rotation thereof a number thereon forms one of said numbers in display, and actuating means operatively connected at one end to advance said wheel in rotation and at its other end accessible through said number-displaying device housing for actuating said wheel in rotation to change the numbers in display, and stop means movable between a clearance position in which said shutter is operative and a stop position in which said shutter is inoperative, said stop means being operatively connected to said wheel actuating means for moving said stop means to its clearance position to permit operation of said shutter mechanism such that said shutter mechanism is operative only after the operation of said actuating means.

References Cited

UNITED STATES PATENTS

| | | | |
|---|---|---|---|
| 2,433,129 | 12/1947 | Land | 95—1.1 X |
| 2,891,439 | 6/1959 | Lee | 95—1.1 X |
| 2,987,976 | 6/1961 | Martin | 95—1.1 |

JOHN M. HORAN, *Primary Examiner.*